(12) United States Patent
Zeng et al.

(10) Patent No.: US 12,370,628 B2
(45) Date of Patent: Jul. 29, 2025

(54) METHOD AND APPARATUS FOR PROCESSING CHIP BASED ON DEEP LEARNING

(71) Applicants: Chongqing Institute of East China Normal University, Chongqing (CN); ROI Optoelectronics Technology CO, LTD., Shanghai (CN); East China Normal University, Shanghai (CN)

(72) Inventors: Heping Zeng, Chongqing (CN); Mengyun Hu, Chongqing (CN); Chuan Yang, Chongqing (CN); Shuai Yuan, Chongqing (CN)

(73) Assignees: CHONGQING INSTITUTE OF EAST CHINA NORMAL UNIVERSITY, Chongqing (CN); ROI OPTOELECTRONICS TECHNOLOGY CO, LTD., Shanghai (CN); EAST CHINA NORMAL UNIVERSITY, Shanghai (CN)

( * ) Notice: Subject to any disclaimer, the term of this patent is extended or adjusted under 35 U.S.C. 154(b) by 925 days.

(21) Appl. No.: 17/528,569

(22) Filed: Nov. 17, 2021

(65) Prior Publication Data
US 2022/0152742 A1 May 19, 2022

(30) Foreign Application Priority Data
Nov. 17, 2020 (CN) .......................... 202011281956.5

(51) Int. Cl.
*B23K 26/0622* (2014.01)
*B23K 26/03* (2006.01)
(Continued)

(52) U.S. Cl.
CPC .......... *B23K 26/364* (2015.10); *B23K 26/032* (2013.01); *B23K 26/0624* (2015.10);
(Continued)

(58) Field of Classification Search
USPC ........ 128/920–925; 378/1–87; 382/100–205, 382/276–305; 438/931–983; 706/1–62,
(Continued)

(56) References Cited

U.S. PATENT DOCUMENTS 11,796,794 B2 * 10/2023 Fan ........................ G02B 1/002

FOREIGN PATENT DOCUMENTS

| CN | 107199397 A | 9/2017 |
| CN | 109848565 A | 6/2019 |
| CN | 111504227 A | 8/2020 |

OTHER PUBLICATIONS

Wang, Fan; A High-speed Three-dimensional Multimodal Imaging System and Method; 2020 (Year: 2020).*

(Continued)

*Primary Examiner* — Marcellus J Augustin
(74) *Attorney, Agent, or Firm* — Hodgson Russ LLP

(57) ABSTRACT

A method for processing a chip based on deep learning and an apparatus for processing a chip based on deep learning are provided. The method includes scanning the chip with femtosecond laser in a predetermined polarization state to produce a main scanning trajectory and periodic nano-stripes on both sides of the main scanning trajectory, so as to form a nano-ridge structure on a surface of the chip; obtaining a super-resolution microscopic image of the nano-ridge structure by super-resolution microscopy; obtaining a target image; reconstructing the target image based on deep learning for image super-resolution to obtain the reconstructed image, and recognizing and processing the reconstructed image to obtain characteristic parameters of the nano-ridge structure as input parameters for deep learning for femtosecond laser processing; adjusting processing parameters of the chip according to the output values of the (Continued)

deep learning model for femtosecond laser processing; and outputting the optimized nano-ridge structure.

20 Claims, 5 Drawing Sheets

(51) Int. Cl.
| | |
|---|---|
| *B23K 26/08* | (2014.01) |
| *B23K 26/082* | (2014.01) |
| *B23K 26/364* | (2014.01) |
| *B23K 26/402* | (2014.01) |
| *G06N 20/00* | (2019.01) |
| *G06T 3/40* | (2024.01) |
| *G06T 3/4046* | (2024.01) |
| *G06T 3/4053* | (2024.01) |
| *G06T 7/00* | (2017.01) |
| *B23K 103/00* | (2006.01) |

(52) U.S. Cl.
CPC .......... *B23K 26/082* (2015.10); *B23K 26/402* (2013.01); *G06N 20/00* (2019.01); *G06T 3/4046* (2013.01); *G06T 3/4053* (2013.01); *G06T 7/0006* (2013.01); *B23K 2103/56* (2018.08); *G06T 2207/10056* (2013.01); *G06T 2207/20081* (2013.01); *G06T 2207/20084* (2013.01); *G06T 2207/30148* (2013.01)

(58) Field of Classification Search
USPC .......................... 706/900–905; 977/700–963
See application file for complete search history.

(56) References Cited

OTHER PUBLICATIONS

Cao, Kai-jiang; A Double-Femtosecond Laser Beam Column Lens Converging Device Interference Prepare Large-area Periodical Micro-nano Structure; 2019 (Year: 2019).*

CNIPA, Office Action for CN Application No. 202011281956.5, Nov. 9, 2022.

* cited by examiner

METHOD AND APPARATUS FOR PROCESSING CHIP BASED ON DEEP LEARNING

CROSS-REFERENCE TO RELATED APPLICATION

This application claims priority to, and the benefits of, Chinese Patent Application Serial No. 202011281956.5, filed on Nov. 17, 2020, the entire content of which is incorporated herein by reference.

FIELD

The present disclosure belongs to the field of processing techniques of 5G chips, and more particularly relates to a method for processing a chip based on deep learning and an apparatus for processing a chip based on deep learning.

BACKGROUND

Femtosecond laser micro-nano processing technologies have caused ultra-short time and ultra-strong peak power. Femtosecond laser has replaced the traditional laser processing method and applied in a new field of ultra-fine and low-damage processing of materials, for example, widely used in precise processing, integrated circuits, consumer electronics, medical cosmetology, aerospace, photovoltaic energy and other fields. Femtosecond laser has the characteristics of precise target focusing and positioning, and can focus in an ultra-micro space. The application of ultra-fine processing to advanced manufacturing technology can directly promote certain key production technologies, such as integrated circuits. At present, the femtosecond laser micro-nano processing technology can meet the processing needs of precision cutting and drilling of 5G chips, as well as the direct processing of circuit patterns of related 5G chips. However, with the continuous application and development of 5G technology, the performance requirements of 5G chips are gradually increased, and the use requirements of 5G chips are usually met through the application of advanced materials, optimization of processing structures, improvement of processes and other methods. Obviously, the existing femtosecond laser micro-nano processing technology is difficult to meet the higher processing requirements put forward by the development of high-performance chips, and there are also problems such as slow processing speed and low intelligence. Therefore, the optimization and innovation of the femtosecond laser micro-nano processing technology applied to 5G chips is an inevitable way for the development of this processing technology.

SUMMARY

Embodiments of the present disclosure seek to solve at least one of the problems existing in the related art to at least some extent.

According to a first aspect of the present disclosure, a method for processing a chip based on deep learning is provided. The method includes steps:
1) scanning the chip with femtosecond laser in a predetermined polarization state to produce a main scanning trajectory and periodic nano-stripes on both sides of the main scanning trajectory, so as to form a nano-ridge structure on a surface of the chip;
2) obtaining a super-resolution microscopic image of the nano-ridge structure by super-resolution microscopy, removing an invalid area around the microscopic image, retaining a periodic nano-stripe area in a center of the microscopic image, and scaling the microscopic image to a preset size to obtain a target image;
3) reconstructing the target image based on deep learning for image super-resolution to obtain the reconstructed image, and recognizing and processing the reconstructed image to obtain characteristic parameters of the nano-ridge structure as input parameters ($x_1$, $x_2$, ..., $x_i$) of an input layer X of a deep learning model for femtosecond laser processing;
4) directing the input parameters of the input layer X into a neutral network including M hidden layers $h_1$, $h_2$, ..., $h_m$ for deep learning for femtosecond laser processing, activating a respective hidden layer by performing nonlinear transformation on input parameters of a previous layer with a nonlinear activation function f(W, b), where W represents a weight value, and b represents an offset value, and performing deep learning in the M hidden layers to obtain output values ($y_1$, $y_2$, ..., $y_j$) of an output layer Y of the deep learning model for femtosecond laser processing;
5) evaluating inconsistency between the output values ($y_1$, $y_2$, ..., $y_j$) of the output layer Y of the deep learning model for femtosecond laser processing and a target value O using a loss function L to obtain a loss function value θ represented by a formula:

$$\theta = L(Y, O)$$

so as to complete a training process for deep learning;
6) adjusting corresponding processing parameters of the chip according to the output values ($y_1$, $y_2$, ..., $y_j$) of the output layer Y, optimizing the weight value W and the offset value b of the deep learning model, and repeating step 2) to step 5) for repeated training for femtosecond laser processing to minimize the loss function value θ; and
7) outputting the optimized nano-ridge structure.

According to a second aspect of the present disclosure, an apparatus for processing a chip based on deep learning is provided for performing the method for processing a chip based on deep learning according to the first aspect of the present disclosure. The apparatus includes a processing platform, on which a chip to be processed is placed and fixed; a laser device configured to emit femtosecond laser with adjustable pulse width, laser energy, repetition frequency and polarization state; a scanning device movable in a direction in an XY plane, and configured to position a laser spot and scan the chip with the laser spot; a focusing device configured to focus the femtosecond laser; an imaging device configured to obtain a super-resolution microscopic image of a nano-ridge structure on a surface of the chip, and obtain a target image by removing an invalid area around the microscopic image, retaining a periodic nano-stripe area in a center of the microscopic image, and scaling the microscopic image to a preset size; an adjusting device configured to adjust a translation of the processing platform in an X, Y or Z direction, or a rotation of the processing platform about a Z axis; a positioning device configured to position the chip; and a controller configured to control the laser device, the scanning device, the imaging device, the adjusting device, and the positioning device, and comprising a deep learning unit embedded therein.

The deep learning unit is configured to:
reconstruct the target image obtained by the imaging device based on deep learning for image super-resolution to obtain the reconstructed image, and recognize and process the reconstructed image to obtain characteristic parameters of the nano-ridge structure as input parameters $(x_1, x_2, \ldots, x_i)$ of an input layer X of a deep learning model for femtosecond laser processing;

direct the input parameters of the input layer X into a neutral network including M hidden layers $h_1$, $h_2, \ldots, h_m$ for deep learning for femtosecond laser processing, activate a respective hidden layer by performing nonlinear transformation on input parameters of a previous layer with a nonlinear activation function f(W, b), where W represents a weight value, and b represents an offset value, and perform deep learning in the M hidden layers to obtain output values $(y_1, y_2, \ldots, y_j)$ of an output layer Y of the deep learning model for femtosecond laser processing;

evaluate inconsistency between the output values $(y_1, y_2, \ldots, y_j)$ of the output layer Y of the deep learning model for femtosecond laser processing and a target value O using a loss function L to obtain a loss function value θ represented by a formula:

$$\theta = L(Y, O)$$

so as to complete a training process for deep learning; and adjust corresponding processing parameters of the chip according to the output values $(y_1, y_2, \ldots, y_j)$ of the output layer Y, optimize the weight value W and the offset value b of the deep learning model, and perform repeated training to minimize the loss function value θ.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which.

DETAILED DESCRIPTION

Figure 1:
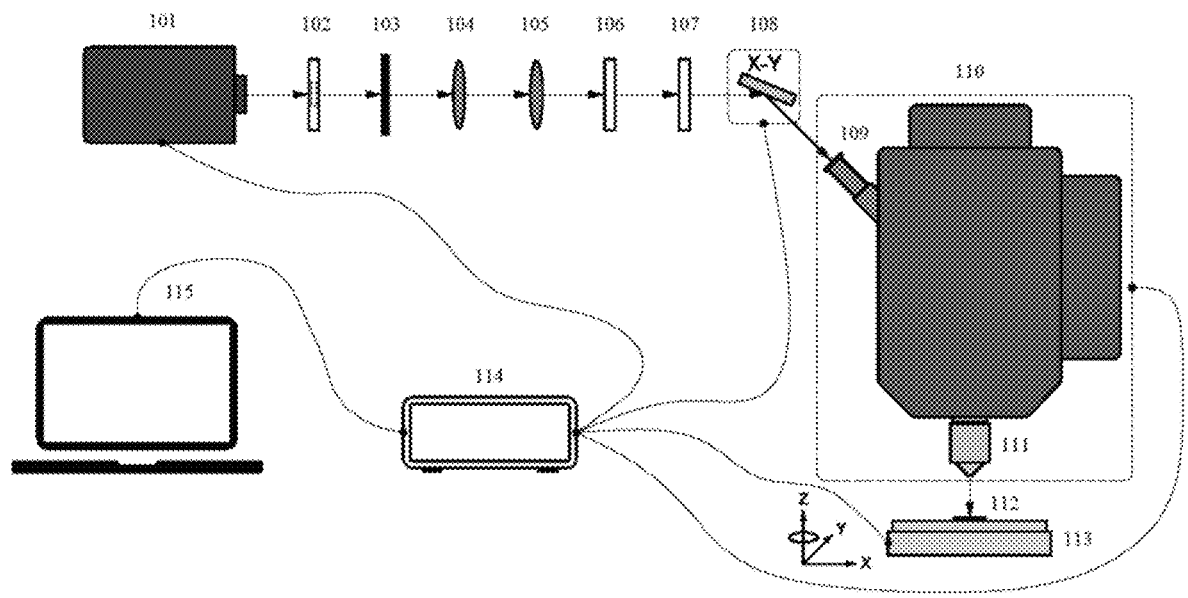
FIG. 1 is a schematic diagram of an apparatus for processing a 5G chip in an embodiment of the present disclosure, which shows an optical path of the apparatus.

Reference will be made in detail to embodiments of the present disclosure. The embodiments described herein with reference to drawings are explanatory, illustrative, and used to generally understand the present disclosure. The embodiments shall not be construed to limit the present disclosure.

The same or similar elements and the elements having same or similar functions are denoted by like reference numerals throughout the descriptions.

Surface plasmon polaritons (SPPs) are an electromagnetic wave mode generated by the interaction of free electrons and photons when free electrons on the surface of a medium are irradiated by incident light with the same resonant frequency. Generally, the wave vector of the surface plasmon polaritons is larger than the light wave vector under the same frequency, and it is necessary to ensure that the wave vector of the excitation light matches the wave vector of the surface plasmon polaritons through a coupling method in order to produce the surface plasmon polaritons. The use of surface plasmon polaritons can break through the optical diffraction limit to a limited extent and produce ultra-fine nano-grating structures. In particular, the surface plasmon polariton technology based on femtosecond laser can convert the physical properties of femtosecond laser multi-pulse ablation from an optical state to an electrostatic state, so that the size of the ablated nano-grating structures breaks through the diffraction limit and the processing of 10 nm nano-gratings can be achieved.

Super-resolution microscopies refer to microscopies with a resolution less than the optical diffraction limit size, breaking through the resolution limit (i.e. 200 nm) for an optical microscope, and achieving microscopic imaging with a super-resolution of tens of nanometers or even more than ten nanometers. Common super-resolution microscopies include stimulated emission depletion microscopy (STED), photoactivated localization microscopy (PALM), structured illumination microscopy (SIM), stochastic optical reconstruction microscopy (STORM), and the like. In addition, surface plasmon excitation is used to amplify surface waves and perform parametric imaging, and a surface plasmon resonance super lens is fabricated, which can realize microscopic imaging with a super-resolution less than the diffraction limit. Compared with scanning electron microscopy (SEM), transmission electron microscopy (TEM), atomic force microscopy (AFM) and other technologies that are usually more destructive to samples, use of super-resolution microscopies do not cause damage to samples, and can even observe biological living samples, for example, enables clearer observation of biological structures within 200 nm in size. The application of super-resolution microscopies is of great significance to the development of human science, especially life sciences. Similarly, with the aid of super-resolution microscopies, in the field of micro-nano processing, it is possible to observe and monitor the processed sub-diffraction-limit micro-nano structures. The use of super-resolution microscopies can make the observation and processing processes have a higher synchronization, and even can realize online real-time monitoring.

According to embodiments of the present disclosure, based on the optimization and innovation of the femtosecond laser processing of the 5G chip, femtosecond laser with a specific polarization state can be used to modulate and form a 5G chip with a nano-ridge structure on a surface thereof, and surface plasmon polaritons excited by femtosecond laser can lead to a sub-diffraction-limit nano-ridge structure with the smallest spacing reaching 10 nm. The processed nano-ridge structure can be learned and optimized through super-resolution microscopy and deep learning technology, to provide a method for processing a 5G chip based on deep learning and an apparatus for processing a 5G chip based on deep learning. While scanning and processing a main trajectory of the 5G chip, periodic nano-stripes are formed in a direction perpendicular to the main scanning trajectory. The overall structure is similar to a ridge, so it is called a nano-ridge structure. According to embodiments of the present disclosure, a nano-ridge structure is formed on the surface of the chip, and it is possible to break through the diffraction limit size to form a nano-ridge structure with a pitch of up to 10 nm, which can significantly increase the surface area of the chip, improve the signal transmission/reception efficiency of the chip, and thus optimize the chip signal. Meanwhile, it is possible to improve the heat dissipation efficiency of the chip by increasing the surface area.

In the following description, the 5G chip is described as an example, however, it can be understood that chips in other fields can be processed by the method according to embodiments of the present disclosure.

An object of the present disclosure is to provide a method for processing a 5G chip based on deep learning and an apparatus for processing a 5G chip based on deep learning, where femtosecond laser with a specific polarization state is used to excite surface plasmon polaritons. Based on super-resolution microscopy combined with deep learning technology, the laser energy, repetition frequency, and polarization state of femtosecond laser, the scanning speed and the like can be actively and intelligently adjusted in real time during the scanning process. A periodic nano-stripe structure that breaks through the diffraction limit size can be modulated while scanning the main trajectory on a surface of the 5G chip, and thus a 5G chip with a ridge-shaped surface can be produced. By increasing the surface area of the 5G chip with a ridge-shaped surface, it is possible to enhance the signal transmitting/receiving efficiency of the chip, and improve the heat dissipation efficiency of the chip, thereby realizing the optimization of the chip signal.

With the method for processing a 5G chip based on deep learning according to embodiments of the present disclosure, the 5G chip is scanned and processed by femtosecond laser with a specific polarization state, and by adjusting parameters such as laser energy, repetition frequency, polarization state, and scanning speed, periodic nano-stripes with a nanometer spacing can be generated on both sides of the main trajectory of the 5G chip while scanning the main trajectory, thereby forming a continuous nano-ridge structure on the surface of the 5G chip.

With the method for processing a 5G chip based on deep learning according to embodiments of the present disclosure, femtosecond laser is used to excite surface plasmon polaritons for processing, and a continuous ultra-diffraction-limit nano-ridge structure can be formed on the surface of the 5G chip by adjusting the physical properties of femtosecond laser ablation from an optical state to an electrostatic state.

With the method for processing a 5G chip based on deep learning according to embodiments of the present disclosure, by using the combination of deep learning technology and super-resolution microscopy, it is possible to obtain super-resolution microscopic images of the processing position in real time, which can clearly recognize, analyze and process the microscopic features of the processed nano-ridge structure.

With the method for processing a 5G chip based on deep learning according to embodiments of the present disclosure, by using the combination of deep learning technology and femtosecond processing technology, it is possible to quickly, efficiently and intelligently adjust and optimize processing parameters during the processing process, and thus a 5G chip having a ridge-shaped surface with stable structure and excellent performance can be formed.

In an aspect, a method for processing a 5G chip based on deep learning is provided. The method includes steps as follows:

1) scanning the 5G chip with femtosecond laser in a predetermined polarization state to produce a main scanning trajectory and periodic nano-stripes on both sides of the main scanning trajectory, so as to form a nano-ridge structure on a surface of the 5G chip;
2) obtaining a super-resolution microscopic image of the nano-ridge structure by super-resolution microscopy, removing an invalid (e.g., blank) area around the microscopic image, retaining a periodic nano-stripe area in a center of the microscopic image, and scaling the microscopic image to a preset size to obtain a target image;
3) reconstructing the target image based on deep learning for image super-resolution to obtain the reconstructed image, and recognizing and processing the reconstructed image to obtain characteristic parameters of the nano-ridge structure as input parameters ($x_1$, $x_2$, ..., $x_i$) of an input layer X of a deep learning model for femtosecond laser processing;
4) directing the input parameters of the input layer X into a neutral network including M hidden layers $h_1$, $h_2$, ..., $h_m$ for deep learning for femtosecond laser processing, activating a respective hidden layer by performing nonlinear transformation on input parameters of a previous layer with a nonlinear activation function f(W, b), where W represents a weight value, and b represents an offset value, and performing deep learning in the M hidden layers to obtain output values ($y_1$, $y_2$, ..., $y_j$) of an output layer Y of the deep learning model for femtosecond laser processing;
5) evaluating inconsistency between the output values ($y_1$, $y_2$, ..., $y_j$) of the output layer Y of the deep learning model for femtosecond laser processing and a target value O using a loss function L to obtain a loss function value θ represented by a formula:

$$\theta = L(Y, O)$$

so as to complete a training process for deep learning;
6) adjusting corresponding processing parameters of the 5G chip according to the output values ($y_1$, $y_2$, ..., $y_j$) of the output layer Y, optimizing the weight value W and the offset value b of the deep learning model for femtosecond laser processing, and repeating step 2) to step 5) for repeated training for femtosecond laser processing to minimize the loss function value θ; and
7) outputting the optimized nano-ridge structure.

With the method according to embodiments of the present disclosure, by deep learning through multiple iteration to actively adjust the processing parameters and optimize the parameters of the deep learning model for femtosecond laser processing, the loss function value θ can be minimized, thereby outputting the optimized periodic nano-stripe of the nano-ridge structure with stable structure and excellent performance.

In some embodiments, the femtosecond laser has a pulse width equal to or less than 200 fs, a repetition frequency of 1 KHz to 1 GHz, and a laser energy of 0 to 100 mW, preferably 10 to 100 mW.

In some embodiments, the predetermined polarization state is a predetermined angle between a laser polarization direction and a scanning direction, and the predetermined angle is kept unchanged by the deep learning for femtosecond laser processing during the scanning.

In some embodiments, the chip is scanned by one of three ways as follows:
  keeping the position of the chip unchanged, controlling laser to scan the chip along the main processing trajectory (i.e. the main scanning trajectory) with a scanning direction varied with the processing trajectory, and keeping an angle between the laser polarization direction and the scanning direction (i.e. the main processing trajectory) unchanged by intelligent control;
  keeping the focus position of laser unchanged, controlling the chip to move along the main processing trajectory, and adjusting the position and direction of the chip so as to keep an instant movement direction of the chip with respect to laser constant, without adjusting the laser polarization direction; and
  keeping the scanning direction of laser unchanged, adjusting the position and direction of the chip, and forming the main trajectory while keeping the scanning direction unchanged, without adjusting the laser polarization direction.

In some embodiments, the scanning speed ranges from 100 to 1000 μm/s.

In some embodiments, the periodic nano-stripes of the nano-ridge structure are equally spaced, and a spacing between two adjacent nano-stripes ranges from 10 nm to 1 μm by controlling the femtosecond laser ablation to convert from an optical state to an electrostatic state. Specifically, a spacing between two adjacent sub-diffraction-limit nano-stripes of the nano-ridge structure ranges from 10 to 200 nm. The sub-diffraction-limit nano-stripes of the nano-ridge structure can be formed by surface plasmon polariton technology with femtosecond laser. By controlling the laser power to be close to the damage threshold of the material and adjusting the number of pulses to convert the physical properties of femtosecond laser ablation from an optical state to an electrostatic state, it is possible to perform ultra-fast and non-thermal processing.

In some embodiments, an angle between a main scanning trajectory and each of the periodic nano-stripes ranges from 0 to 90°, preferably 90°.

In some embodiments, the super-resolution microscopy is super-lens imaging based on surface plasmon resonance, stimulated emission depletion microscopy (STED), photo-activated localization microscopy (PALM), structured illumination microscopy (SIM), stochastic optical reconstruction microscopy (STORM), or the like.

In some embodiments, the deep learning includes deep learning for image super-resolution and deep learning for femtosecond laser processing.

In some embodiments, the super-resolution microscopic image of the nano-ridge structure is obtained by the deep learning for image super-resolution based on the established deep learning model for image super-resolution in real time. The processing parameters of the nano-ridge structure are adjusted and optimized by the deep learning for femtosecond laser processing based on a deep learning model for femtosecond laser processing, which is initialized and optimized during the femtosecond laser processing.

In some embodiments, the super-resolution microscopic image is taken at a frequency greater than or equal to 50 fps, thereby ensuring the accuracy, rapidity and authenticity of image data of the nano-ridge structure.

In some embodiments, after cropping and scaling, the target image is highly consistent with the super-resolution microscopic image so as to ensure consistent image characteristics.

In some embodiments, the target image is processed based on deep learning for image super-resolution. Preferably, the target image is subjected to super-resolution reconstruction based on deep learning for image super-resolution to further optimize the target image.

In some embodiments, the periodic nano-stripe of the nano-ridge structure in the reconstructed image is clearly visible in a predetermined image size, which may be identical to the size of the target image;
  recognizing and processing the reconstructed image comprises:
  recognizing the reconstructed image,
  performing data enhancement, and
  performing data preprocessing to obtain one-dimensional vectors as the input parameters $(x_1, x_2, \ldots, x_i)$, wherein the input parameters correspond to the characteristic parameters of the nano-ridge structure comprising a length, a spacing, and a parallelism degree of the periodic nano-stripes.

The input parameters of input layers during different training processes can be acquired, recognized and processed in the same manner.

The features of the input parameters can be automatically obtained by the deep learning model.

In some embodiments, activating the respective hidden layer by performing nonlinear transformation on input parameters of the previous layer with the nonlinear activation function f(W, b) comprises:
  activating the hidden layers $h_1, h_2, \ldots, h_m$ with the corresponding nonlinear activation functions:

$$h_1 = f(W_1 X + b_1)$$
$$h_2 = f(W_2 h_1 + b_2)$$
$$\ldots$$
$$h_m = f(W_m h_{m-1} + b_m)$$

where $W_1, W_2, \ldots, W_m$ represent weight values of the respective hidden layers and are corresponding matrix vectors, and $b_1, b_2, \ldots, b_m$ represent offset values of the respective hidden layers and are corresponding matrix vectors, performing deep learning in the M hidden layers comprises:
performing deep learning in the hidden layers $h_1, h_2, \ldots, h_m$ to obtain one-dimensional vectors as the output values $(y_1, y_2, \ldots, y_j)$ of the output layer Y:

$$Y = f(W_{m+1} h_m + b_{m+1})$$

where the one-dimensional vectors correspond to processing parameters comprising a laser energy, a repetition frequency, a polarization state, and a scanning speed, and $W_{m+1}$ and $b_{m+1}$ represent a weight value and an offset value of the output layer, respectively, and are corresponding matrix vectors.

The output parameters of the output layer Y correspond to real-time parameters of femtosecond laser processing of the 5G chip, and thus the real-time parameters of femtosecond laser processing can be adjusted according to the output parameters.

The parameters $W_1, W_2, \ldots, W_m$ and $b_1, b_2, \ldots, b_m$ in the deep learning model for femtosecond laser processing need to be initialized before deep learning training. These parameters are initialized by initializing the nonlinear activation function determined in a deep learning algorithm embedded in the femtosecond laser processing device while setting the processing parameters.

In step 6), the weight value W and the offset value b of the deep learning model for femtosecond laser processing are optimized by repeated training the deep learning for femtosecond laser processing, so as to train and optimize the deep learning model for femtosecond laser processing. Thus, the nano-ridge structure can be intelligently controlled during the femtosecond laser processing to optimize the nano-ridge structure.

The loss function value θ can reflect the accuracy of the deep learning model for femtosecond laser processing. The loss function value θ is gradually reduced during the repeated training to approach a minimum value, which corresponds to the intelligent control stage in the femtosecond laser processing of the 5G chip.

The real-time parameters in the femtosecond laser processing are adjusted during the repeated training.

The loss function value θ is optimized to a minimum value so as to obtain an accurate and stable deep learning model for femtosecond laser processing. Thus, the nano-ridge structure may be stably processed during the femtosecond laser processing, and may be formed with high stability and high consistency.

The entire femtosecond laser processing of the 5G chip with a ridge-shaped surface is performed based on the deep learning so as to perform intelligent control over the periodic nano-stripes of the nano-ridge structure.

Periodic nano-stripes in a direction perpendicular to the main processing trajectory of the chip are formed on both sides of the main processing trajectory, which increases the surface area of the chip to a certain extent. It is possible to enhance the signal transmitting/receiving efficiency of the chip, and improve the heat dissipation efficiency of the chip by increasing the surface area.

Figure 4:
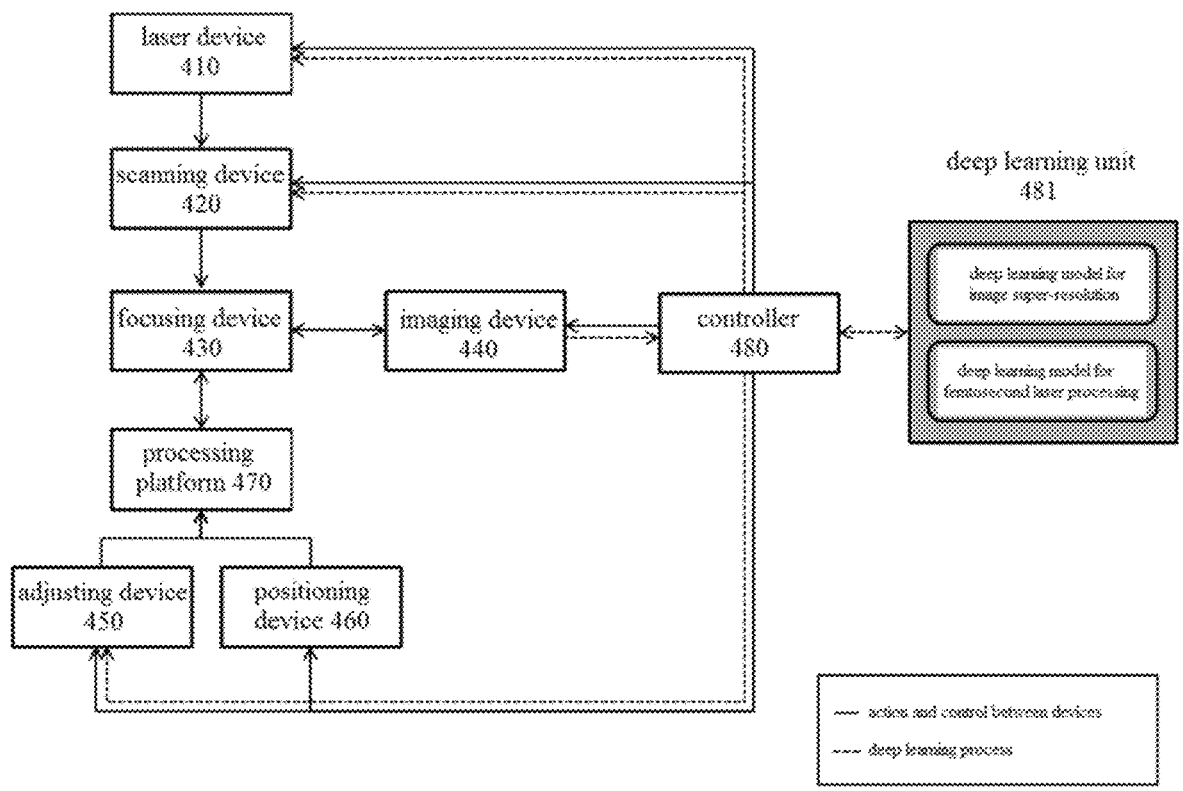
FIG. 4 is a block diagram of an apparatus for processing a 5G chip in an embodiment of the present disclosure.

In another aspect, an apparatus for processing a 5G chip based on deep learning is provided. As shown in FIG. 4, the apparatus includes a laser device 410, a scanning device 420, a focusing device 430, an imaging device 440, an adjusting device 450, a positioning device 460, a processing platform 470, and a controller 480. A chip to be processed is placed and fixed on the processing platform 470. The laser device 410 is configured to emit femtosecond laser with adjustable pulse width, laser energy, repetition frequency and polarization state, which acts as a processing energy source. The scanning device 420 is movable (e.g., translation) in any direction in an XY plane, and configured to position a laser spot with high precision and scan the 5G chip with the laser spot. The focusing device 430 is configured to focus the femtosecond laser.

The imaging device 440 is configured to obtain a super-resolution microscopic image of a nano-ridge structure on a surface of the 5G chip with a resolution of 10 to 60 nm, and obtain a target image by removing an invalid area around the microscopic image, retaining a periodic nano-stripe area in a center of the microscopic image, and scaling the microscopic image to a preset size. Specifically, the imaging device 440 is configured to take a real-time image of the processing position at a frequency greater than or equal to 50 fps. In some embodiments, the imaging device 440 is a super-resolution microscope, and the super-resolution microscopic image is taken at a frequency greater than or equal to 50 fps.

The adjusting device 450 is configured to control the movement of the processing platform 470 with high precision. The adjusting device 450 is configured to adjust a translation of the processing platform in an X, Y or Z direction, or a rotation of the processing platform about a Z axis, so as to perform intelligent control over any position and direction of the 5G chip. The adjusting device 450 is further configured to adjust a scanning speed and a scanning direction in the processing process.

In some embodiments, the chip is scanned by:
adjusting a scanning speed and a scanning direction by the scanning device 420;
adjusting the scanning speed and the scanning direction by the adjusting device 450;
adjusting the scanning speed by the scanning device 420, and adjusting the scanning direction by the adjusting device 450; or
a combination thereof.

The positioning device 460 is configured to position the chip.

The controller 480 is configured to control the laser device 410, the scanning device 420, the imaging device 440, the adjusting device 450, and the positioning device 460, and comprises a deep learning unit 481 embedded therein.

The deep learning unit 481 includes a deep learning model for image super-resolution and a deep learning model for femtosecond laser processing. The deep learning model for image super-resolution is an accurate optimized model, which is obtained by performing deep learning and training on a large number of similar images. The deep learning model for femtosecond laser processing is an initial model without being subjected to deep learning or training before the femtosecond laser processing, which is subjected to deep learning or training during the femtosecond laser processing.

The deep learning unit 481 is configured to:
reconstruct the target image obtained by the imaging device 440 based on deep learning for image super-resolution to obtain the reconstructed image, and recognize and process the reconstructed image to obtain characteristic parameters of the nano-ridge structure as input parameters $(x_1, x_2, \ldots, x_i)$ of an input layer X of a deep learning model for femtosecond laser processing;

direct the input parameters of the input layer X into a neutral network including M hidden layers $h_1$, $h_2, \ldots, h_m$ for deep learning for femtosecond laser processing, activate a respective hidden layer by performing nonlinear transformation on input parameters of a previous layer with a nonlinear activation function f(W, b), where W represents a weight value, and b represents an offset value, and perform deep learning in the M hidden layers to obtain output values $(y_1, y_2, \ldots, y_j)$ of an output layer Y of the deep learning model for femtosecond laser processing;

evaluate inconsistency between the output values $(y_1, y_2, \ldots, y_j)$ of the output layer Y of the deep learning model for femtosecond laser processing and a target value O using a loss function L to obtain a loss function value θ represented by a formula:

$$\theta = L(Y, O)$$

so as to complete a training process for deep learning; and
adjust corresponding processing parameters of the 5G chip according to the output values $(y_1, y_2, \ldots, y_j)$ of the output layer Y, optimize the weight value W and the offset value b of the deep learning model, and perform repeated training to minimize the loss function value θ.

Specifically, the deep learning unit 481 is configured to adjust processing parameters of the laser device 410, the scanning device 420, and the adjusting device 450 according to the output values of the deep learning model for femtosecond laser processing. The deep learning unit 481 is configured to perform deep learning through multiple iteration to optimize and establish a deep learning model for femtosecond laser processing with high accuracy and high stability.

The method according to embodiments of the present disclosure is applied to the femtosecond laser processing of 5G chips, and has the following advantages compared with the existing femtosecond laser processing technologies of 5G chips:

First, according to embodiments of the present disclosure, by using the special action mechanism of femtosecond laser in the specific polarization state on chip processing, it is possible to provide a processing technology of a 5G chip with a specially modulated surface. In particular, femtosecond laser processing based on surface plasmon polaritons can break through the diffraction limit to form a nano-ridge structure with optimal 10 nm periodic nano-stripes, can be applied to related chips in the 5G field, and can also be extended to chips in other fields. The signal and heat dissipation efficiency of the chip can be improved by increasing the surface area of the chip. A microstructure with special characteristics can be modulated based on the processing characteristics of the femtosecond laser, which has innovative significance for the processing technology of the 5G chip.

Second, compared with the direct scanning method, the method according to embodiments of the present disclosure has significant advantages and innovations in obtaining nano-ridge structures with a spacing of tens of nanometers to hundreds of nanometers. The direct scanning method to process nano-ridge structures with similar periodic nano-stripes requires high precision in optomechanics and therefore higher cost; and the laser has to scan through each periodic nano-stripe of the nano-ridge structure, which takes too much time. The method according to embodiments of the present disclosure does not need to be too high-precision, and at the same time, it only needs to perform scanning once to obtain a complex structure, so the cost is low, the yield is high, and it is more practical.

Third, the method according to embodiments of the present disclosure incorporates deep learning technology. Super-resolution image reconstruction is first performed on the real-time processed super-resolution microscopic image through the precise established deep learning model for image super-resolution to further improve the resolution of the image. Then, the real-time processed image optimized by super-resolution reconstruction is input for deep learning for femtosecond laser processing, and the deep learning model for femtosecond laser processing is optimized. At the same time, active adjustment and optimization of processing parameters can be performed by multiple iteration feedback of deep learning, and the formed microstructure is more accurate and stable, and the processing technology has the advantages of high intelligence, high accuracy, rapidity and high stability.

In an embodiment, a focal position of laser is kept unchanged, while a chip to be processed is controlled to move, and the position and direction of the chip is adjusted. In this case, a main trajectory is obtained while keeping a scanning direction unchanged, without adjusting a polarization direction of laser.

FIG. 1 is a schematic diagram of an apparatus for processing a 5G chip in an embodiment, which shows an optical path of the apparatus. In this embodiment, a super-resolution microscopic system is integrated into an optical path for femtosecond laser processing, and the movement of the chip is controlled by controlling a three-dimensional micro-nano fabrication platform to adjust the position and direction of the chip, thus precisely adjusting the scanning speed and scanning direction in a femtosecond laser processing process. Specifically, the apparatus includes a femtosecond laser 101, a shutter 102, an attenuator 103, a combination of lenses 104, 105, a half-wave plate 106, a polarizer 107, a scanning system 108, an eyepiece 109, a super-resolution microscopic system 110, a high-power objective lens 111, a chip 112 to be processed, a three-dimensional micro-nano fabrication platform 113, a highly integrated control box 114, and a computer system 115. The computer system 115 is configured to control the femtosecond laser 101, the scanning system 108, the super-resolution microscopic system 110 and the three-dimensional micro-nano fabrication platform 113 through the highly integrated control box 114. Specifically, the computer system 115 is configured to control the pulse width, laser energy, repetition frequency, polarization state and other parameters of femtosecond laser outputted by the femtosecond laser 101, control X and Y directions of the scanning system 108 with high precision to precisely control a focus position of laser, control the real-time microscopic image acquisition of the femtosecond laser processing in the super-resolution microscopic system 110, and control X, Y, and Z directions and an angle with respect to a Z axis of the three-dimensional micro-nano fabrication platform 113, and the movement speed of the chip, thereby adjusting the position and direction of the chip 112 to be processed, as well as the scanning speed and scanning direction.

Femtosecond laser is output by the femtosecond laser 101. The laser is turned on or off by the shutter 102, and the laser energy is controlled by the attenuator 103. Then, the laser beam is collimated and shaped by the combination of lenses 104, 105. The laser beam passes through the half-wave plate 106 and the polarizer 107 to adjust the polarization state of laser. The incident direction of the laser beam is precisely adjusted by the scanning system 108, such that the laser beam is guided into an optical path of the super-resolution microscopic system through the eyepiece 109 of the super-resolution microscopic system 110. The laser is focused on the chip 112 to be processed through the high-power objective lens 111 of the super-resolution microscopic system 110 for intelligent processing. The scanning system 108 accurately adjusts the incident direction of the laser into the super-resolution microscopic system 110 to keep the laser focus position consistent with the microscopic imaging position. The super-resolution microscopic system 110 includes a CCD imaging system configured to obtain a real-time super-resolution microscopic image of a processing position with an image resolution in the range of 10 to 60 nm, and focus the femtosecond laser guided therein, keeping the laser focus position unchanged. The chip 112 to be processed is placed on the three-dimensional micro-nano fabrication platform 113. In the processing process, through high-precision control of translation in X, Y, and Z directions and rotation about a Z axis, the chip moves along the main trajectory to perform scanning and processing, and at the same time, through the adjustment of the position and direction of the chip 112 to be processed, the tangential direction of a point at the main trajectory is controlled to be consistent with the scanning direction in real time.

The above-mentioned super-resolution microscopic system 110 may be based on super-lens imaging technology based on surface plasmon resonance, and may also be based on existing super-resolution microscopic imaging technologies, including, for example, stimulated emission depletion microscopy (STED), photoactivated localization microscopy (PALM), structured illumination microscopy (SIM), stochastic optical reconstruction microscopy (STORM) and other super-resolution microscopic imaging technologies. By directly integrating the super-resolution microscopic system 110 into the femtosecond laser processing apparatus, real-time observation of the processing process and real-time acquisition and collection of the super-resolution microscopic image can be achieved, and the super-resolution microscopic image with a resolution of 10 to 60 nm can be obtained. The femtosecond laser is used to excite the surface plasma to amplify the surface wave, so that the high-frequency information carried by the surface wave participates in the imaging process, and after optimization, super-diffraction imaging with a resolution of 10 to 60 nm can be performed.

Figure 2A:
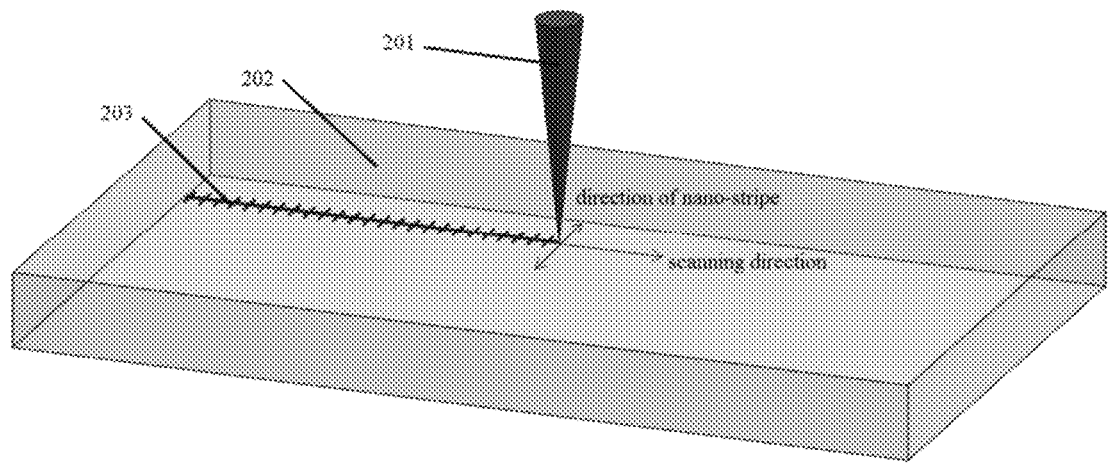
FIG. 2(a) and FIG. 2(b) are schematic views of a nano-ridge structure formed on a surface of a 5G chip in an embodiment of the present disclosure.
Figure 2B:
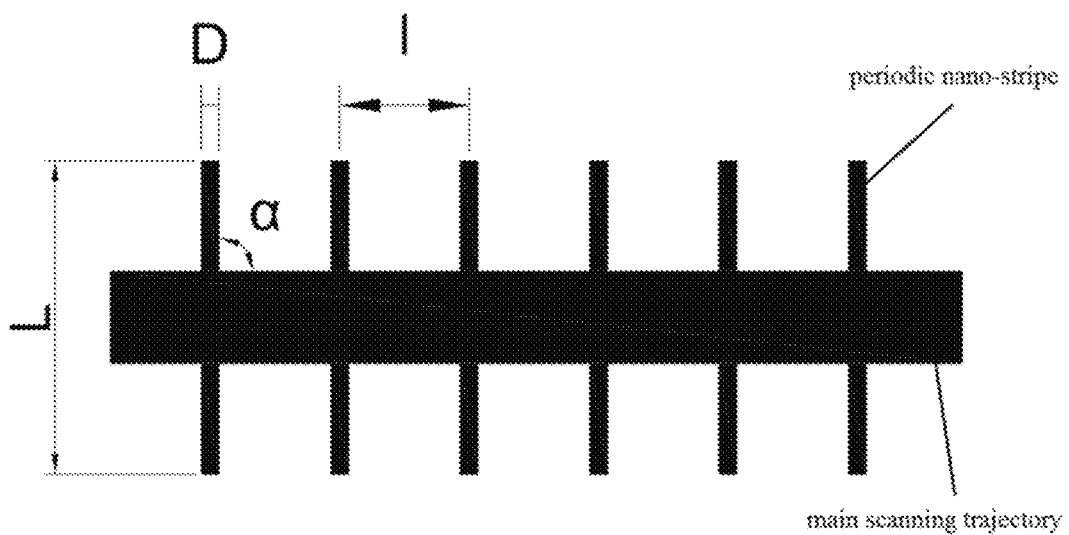

FIG. 2(*a*) and FIG. 2(*b*) are schematic views of a nano-ridge structure formed on a surface of a 5G chip in an embodiment of the present disclosure. The femtosecond laser 201 is focused on the surface of the chip 202, and the nano-ridge structure 203 is formed by controlling the laser energy, repetition frequency, polarization state, scanning speed, and other parameters, as shown in FIG. 2(*a*). The schematic diagram of the nano-ridge structure for intelligent processing is shown in FIG. 2(*b*). The nano-ridge structure includes a main scanning trajectory and continuous periodic nano-stripes modulated. The main scanning trajectory is determined by the size of a focusing light spot, and the modulated continuous nano-stripe is determined by the laser energy, repetition frequency, polarization state, scanning speed, and the like, so that the main parameters such as a length L and width D of the nano-stripe, a spacing 1 between two adjacent nano-stripes, and an angle α between the nano-stripe and the main trajectory can be controlled.

As shown in FIG. 2(*a*) and FIG. 2(*b*), the formation mechanism of this type of nano-ridge structure is as follows: when the femtosecond laser acts on the surface of the chip material, the irradiation energy of the femtosecond laser is higher than the action threshold of the laser for the material, and the laser energy is controlled not to be too high to avoid the formation of ablation holes in a processing area. Under the action of multiple pulses, nano-grating stripes with a uniform spacing will be produced on the surface of the material, and the periodic direction is related to the polarization direction of the laser. This nano-grating stripe is formed by acting on the material with a laser light wave. By controlling the laser energy, repetition frequency, polarization state, and appropriate scanning speed, a nano-ridge structure including periodic nano-stripes can be formed on the surface of the 5G chip.

In particular, the femtosecond laser processing technology based on surface plasmon polarizations can realize the conversion of the physical properties of femtosecond laser processing from an optical state to an electrostatic state by adjusting the laser power and the number of pulses of the femtosecond laser. The process is transformed from non-ultra-fast, thermal processing to ultra-fast, non-thermal processing. Specifically, by controlling the laser power to be close to the damage threshold of the material and adjusting the multi-pulse feedback, ultra-fine periodic nano-stripes can be formed under the action of femtosecond laser processing in the electrostatic state, and the spacing of the periodic stripes can break through the diffraction limit size. Especially, periodic nano-stripes with a spacing of 10 nm can be formed, and the processing and control of periodic nano-stripes with a spacing of 10 to 200 nm can be achieved. When the laser power is controlled to be higher than the damage threshold of the material, in the optical state, periodic nano-stripes can also be formed by femtosecond laser processing, but the spacing of periodic nano-stripes cannot be less than the diffraction limit size, and the processing and control of the periodic nano-stripes with a spacing of 200 nm to 1 μm can be realized. Therefore, by controlling the power of laser irradiation, the conversion of different physical characteristics of femtosecond laser processing can be realized, and the processing of the nano-ridge structure including periodic nano-stripes with a spacing of 10 nm to 1 μm can be realized in combination with scanning.

Figure 3:
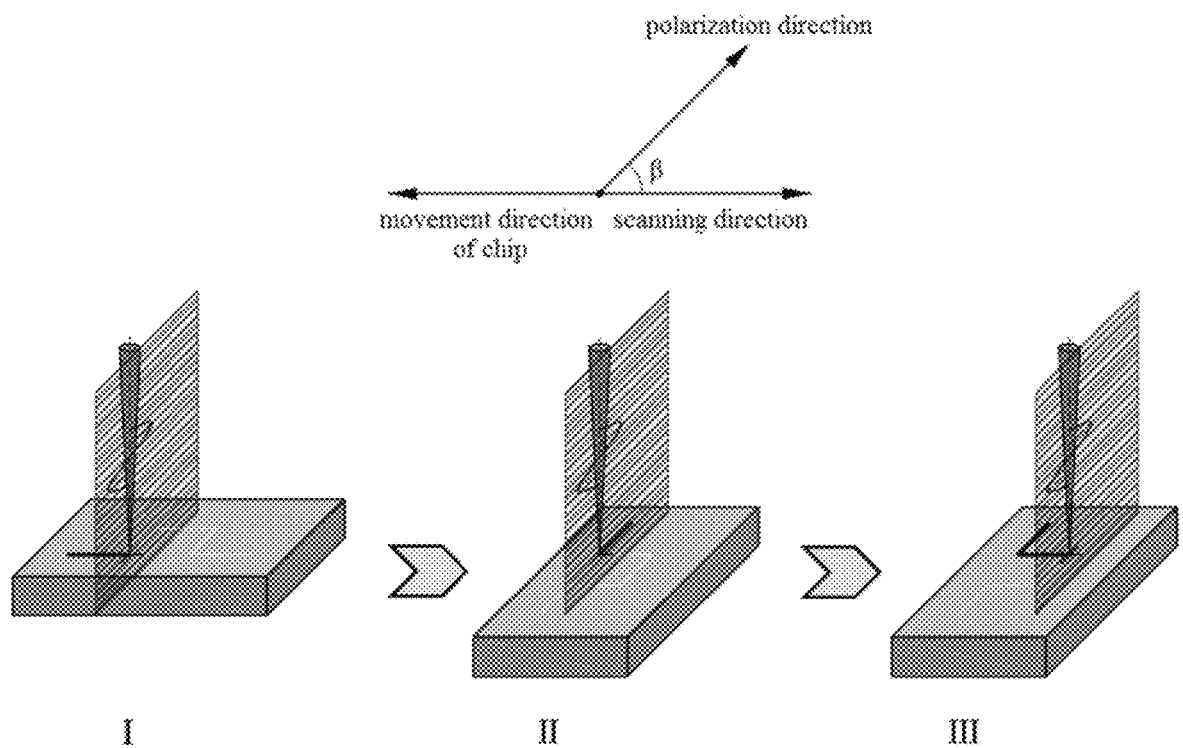
FIG. 3 is a schematic diagram showing the control of a processing process of a 5G chip in an embodiment of the present disclosure.

FIG. 3 is a schematic diagram showing the control of a processing process of a 5G chip in an embodiment of the present disclosure. In this embodiment, a focus position of the laser is kept unchanged, the chip is controlled to move, and the position and direction of the chip are adjusted. The scanning direction shown in FIG. 3 is the relative movement direction between the focus position of laser and the chip. During the processing, the position and direction of the chip are adjusted, and the scanning speed and scanning direction are constant to form a trajectory required by the chip. First, the laser polarization direction and the scanning direction are adjusted to maintain an included angle β therebetween. During the processing process, the laser polarization direction and the scanning direction remain unchanged, and the three-dimensional micro-nano fabrication platform is adjusted to control the movement and real-time orientation of the chip to perform scanning. When the trajectory to be processed is consistent with the preset scanning direction and the orientation of the chip as in case I, the three-dimensional micro-nano fabrication platform is controlled to translate the chip in a direction opposite to the scanning direction at a certain scanning speed, and perform scanning and processing. During the processing, the orientation of the chip is controlled by rotating or translating the three-dimensional micro-nano fabrication platform, such that the tangent direction of a trajectory of points to be processed is always consistent with the scanning direction, and the processing of any trajectory is completed, as in cases II and III. By using the method according to embodiments of the present disclosure to intelligently control the processing position and direction of the chip and the movement speed of the chip, the processed nano-ridge structure is always consistent with the processing trajectory.

FIG. 4 is a block diagram of an apparatus for processing a 5G chip in an embodiment of the present disclosure. The apparatus includes a laser device 410, a scanning device 420, a focusing device 430, an imaging device 440, an adjusting device 450, a positioning device 460, a processing platform 470, and a controller 480. A deep learning unit 481 is embedded in the controller 480.

Specifically, the laser device 410 outputs femtosecond laser, and can control the laser energy, repetition frequency, and polarization state of the output femtosecond laser, so as to meet the processing requirements of the nano-ridge structure on the surface of the chip. The output femtosecond laser passes through the scanning device 420 to achieve high-precision, rapid and intelligent scanning, and after being super-precisely and intelligently focused by the focusing device 430, it acts on the surface of the chip to be processed on the processing platform 470. The adjusting device 450 and the positioning device 460 can be used to realize the high-precision movement and positioning of the chip to be processed on the platform 470, specifically, controls the position and direction of the chip to realize intelligent processing. During the chip processing, the imaging device 440 is a super-resolution microscopic system, which can monitor and record the processing process and processing status of the chip in real time. The super-resolution microscopic system can break through the optical diffraction limit resolution (i.e. 200 nm), and can obtain a super-resolution microscopic image with a resolution of 10 to 60 nm. The controller 480 performs intelligent control of the entire apparatus, and mainly controls the laser device 410, the scanning device 420, the adjusting device 450, and the positioning device 460. The deep learning unit 481 embedded in the controller 480 mainly includes two parts: 1) deep learning for image super-resolution, which is an accurate deep learning model established based on a large number of training images; 2) deep learning for femtosecond laser processing, which requires continuous training and learning during the femtosecond laser processing of the 5G chip with the ridge-shaped surface to train and optimize the established deep learning model.

Figure 5A:
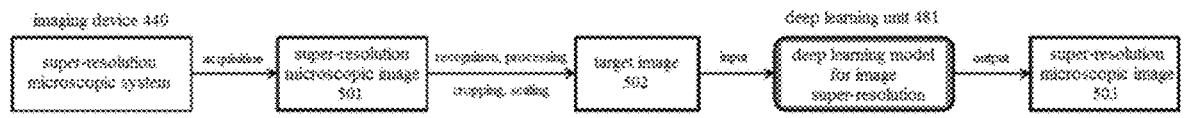
FIG. 5(a) is a schematic diagram showing a deep learning process for image ultra-resolution.
Figure 5B:
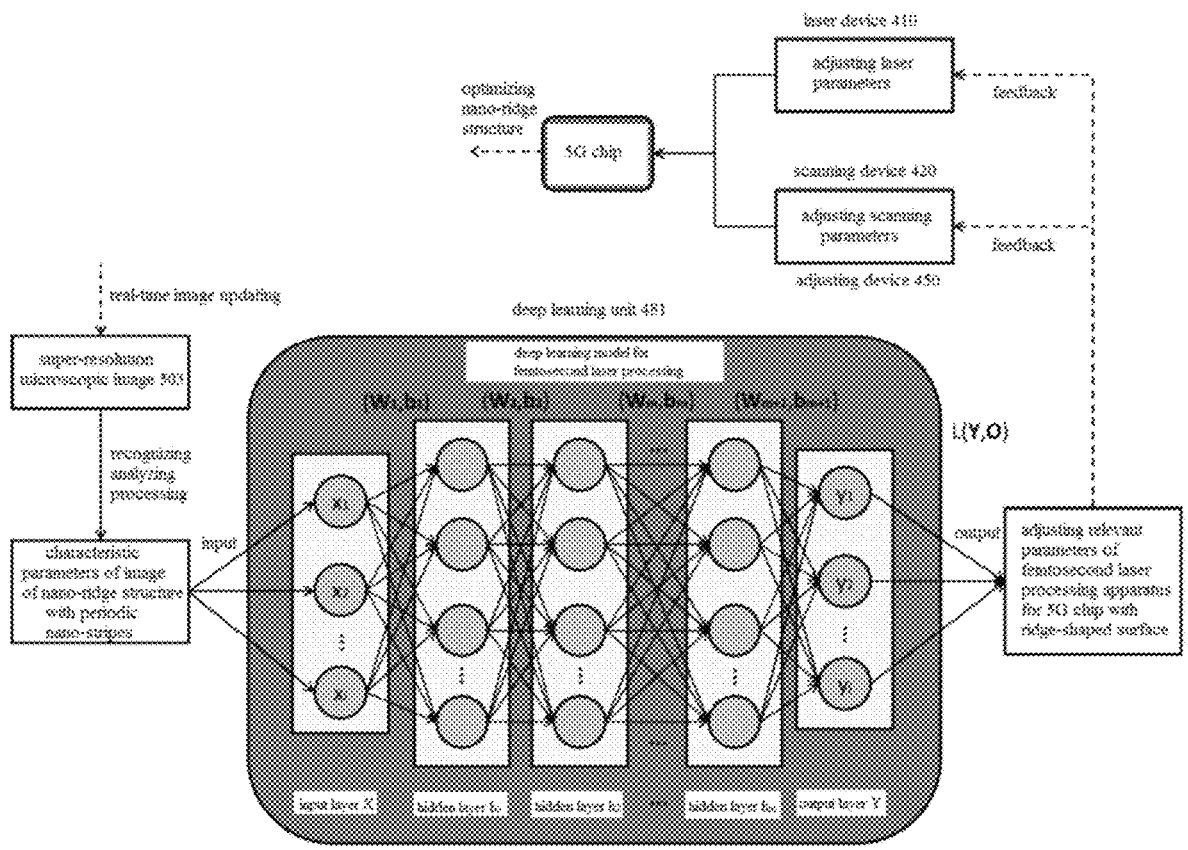
FIG. 5(b) is a schematic diagram showing a deep learning process for femtosecond laser processing.

FIG. 5(*a*) is a schematic diagram of a deep learning process according to an embodiment of the present disclosure, including deep learning for image super-resolution and deep learning for femtosecond laser processing. FIG. 5(*a*) shows the acquisition and processing process of a super-resolution image. The super-resolution microscopic system in the imaging device 440 acquires a super-resolution microscopic image 501 with a resolution of 10 to 60 nm. After the super-resolution microscopic image 501 is recognized and processed, it is cropped to a specific range and zoomed to a specified size to obtain a target image 502 with reduced resolution. The target image 502 is input to the established deep learning model for image super-resolution in the deep learning unit 481 for super-resolution image reconstruction to obtain a super-resolution microscopic image 503 with a resolution reaching 10 nm. Under this resolution, the characteristics of nano-ridge structure can be clearly recognized. The established deep learning model for image super-resolution is an accurate deep learning model that is determined and optimized through a large number of training images. The images in the training library are microscopic pictures of various types of similar nano-grating structures. FIG. 5(*b*) shows the process of femtosecond laser processing and control. In the deep learning process for femtosecond laser processing, the obtained super-resolution microscopic image 503 with a resolution reaching 10 nm is recognized, analyzed and processed to obtain characteristic parameters of the nano-ridge structure. The characteristic parameters of the nano-ridge structure are input into the deep learning model for femtosecond laser processing in the deep learning unit 481 as input parameters for deep learning. After deep learning, the output parameters are converted into control signals, and the control signals are fed back to the laser device 410 and the scanning device 420 through the controller to adjust the respective processing parameters. The 5G chip is processed based on the adjusted processing parameters to optimize the real-time processed nano-ridge structure, and the real-time image updating is performed to obtain the optimized image. The above process is repeated for deep learning training. Through continuous deep learning in the processing process, the apparatus according to embodiments of the present disclosure can perform femtosecond laser processing of 5G chips with ridge-shaped surfaces.

Specifically, the deep learning model in the deep learning unit 481 is composed of a neural network, the deep learning model for image super-resolution has been determined through training and learning, and the deep learning model for femtosecond laser processing needs to be trained and learned in the femtosecond laser processing process to optimize the model, as shown in FIG. 5(*b*). The neural network based deep learning model for femtosecond laser processing includes an input layer X, hidden layers $h_1, h_2, \ldots, h_m$, and an output layer Y, each layer is composed of multiple nodes, and each layer is activated with a non-linear activation function composed of (W, b). In embodiments of the present disclosure, the characteristic parameters of the preprocessed image of the nano-ridge structure with periodic nano-stripes are input into the input layer X, and deep learning is performed through the M hidden layers to obtain the output layer Y According to the output result of the output layer Y, the relevant control parameters of the femtosecond laser processing apparatus for the 5G chip with the ridge-shaped surface are adjusted and then fed back to the laser device 410 and the scanning device 420 for parameter adjustment. Through continuous deep learning and feedback in the processing process, intelligent control and optimization of processing parameters are realized. At the same time, the nano-ridge structure formed on the surface of the 5G chip is adjusted and optimized differently, the processing parameters are gradually stabilized, and thus the nano-ridge structure composed of periodic nano-stripes can be formed with stable structure and excellent performance.

Figure 6:
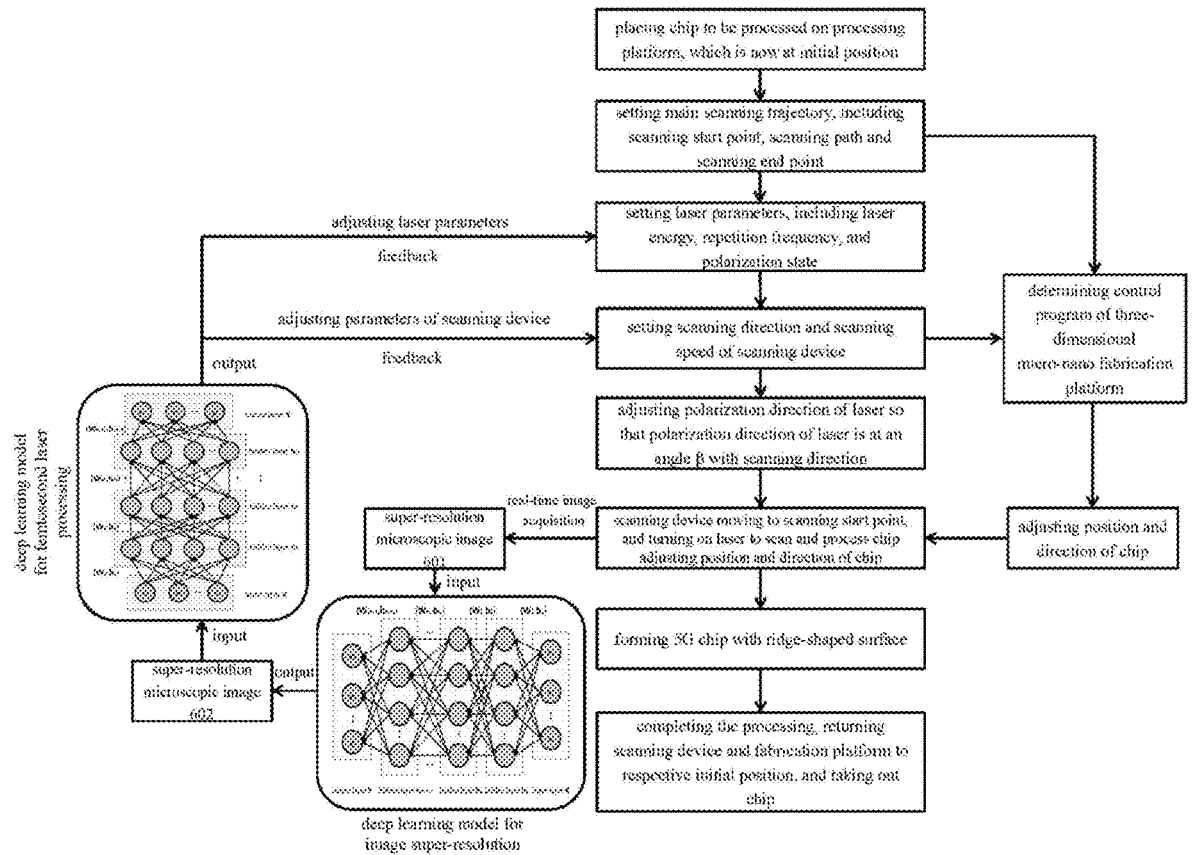
FIG. 6 is a flow diagram of a method for processing a 5G chip in an embodiment of the present disclosure.

FIG. 6 is a flow diagram of a method for processing a 5G chip in an embodiment of the present disclosure.

Generally, the processing program is set by the computer according to the processing requirements of the chip, and combined with the deep learning technology to realize and execute the intelligent control of the processing process of the chip. The specific process includes steps follows:

First, the prepared chip to be processed is placed on a processing platform, which is now at an initial position.

Then, a main scanning trajectory is set, including a scanning start point, a scanning path and a scanning end point. The control program of the three-dimensional micro-nano fabrication platform is determined according to the set main scanning trajectory.

Then, output parameters of laser are set, including laser energy, repetition frequency, polarization state and other parameters.

Then, the scanning direction and scanning speed of a scanning device are set.

Subsequently, the polarization direction of the laser is adjusted so that the polarization direction of the laser is at an angle β with the set scanning direction. In the scanning process, the angle β between the laser polarization direction and the scanning direction is kept constant. In the intelligent processing process, the scanning direction is adjusted according to the calculation results of deep learning.

Subsequently, the scanning device moves to the scanning start point, and the laser is turned on at the same time to scan and process the chip. During the processing, the super-resolution microscopic system in the apparatus acquires a super-resolution microscopic image 601 with a resolution of 10 to 60 nm in real time. After the super-resolution microscopic image 601 is recognized, analyzed and processed, it is first input to the deep learning model for image super-resolution, and then deep learning is performed to output a super-resolution microscopic image 602 with a resolution reaching 10 nm. Then, the super-resolution microscopic image 602 is recognized, analyzed and processed to obtain characteristic parameters of the nano-ridge structure. The characteristic parameters of the nano-ridge structure are input into the deep learning model for femtosecond laser processing, the model is subjected to deep learning and training, and the output parameters are converted into control signals. The control signals are fed back to the laser device and the scanning device to adjust the parameters, and then scanning and processing continue to be performed. Thus, it is possible to achieve intelligent control of the processing process by real-time training through deep learning and feedback.

At the same time, in the processing process, according to the set main scanning trajectory, the set and optimized scanning direction and scanning speed, and the determined control program of the three-dimensional micro-nano fabrication platform, the three-dimensional micro-nano fabrication platform is controlled to move the chip and regulate the position and direction of the chip in real time, such that the scanning direction of the scanning device is kept consistent with the tangential direction of the trajectory to be processed.

Subsequently, through the above-mentioned intelligent processing process based on deep learning, a nano-ridge structure having periodic nano-stripes with stable structure and excellent performance is formed on the surface of the 5G chip.

Finally, the processing of the chip is completed, the scanning device and the three-dimensional micro-nano fabrication platform are automatically adjusted to return to the respective initial position, and the processed chip is taken out.

Throughout the entire processing process, through a large number of rapid training according to the characteristics of the real-time processed nano-ridge structure based on deep learning technology, real-time rapid feedback is provided to the apparatus for active adjustment, so as to realize real-time correction and optimization of processing parameters and status, thus achieving high intelligence, high accuracy, rapidity and high stability of the processing technology.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A method for processing a chip based on deep learning, comprising steps:
   1) scanning the chip with femtosecond laser in a predetermined polarization state to produce a main scanning trajectory and periodic nano-stripes on both sides of the main scanning trajectory, so as to form a nano-ridge structure on a surface of the chip;
   2) obtaining a super-resolution microscopic image of the nano-ridge structure by super-resolution microscopy, removing an invalid area around the microscopic image, retaining a periodic nano-stripe area in a center of the microscopic image, and scaling the microscopic image to a preset size to obtain a target image;
   3) reconstructing the target image based on deep learning for image super-resolution to obtain the reconstructed image, and recognizing and processing the reconstructed image to obtain characteristic parameters of the nano-ridge structure as input parameters $(x_1, x_2, \ldots, x_i)$ of an input layer X of a deep learning model for femtosecond laser processing;
   4) directing the input parameters of the input layer X into a neutral network including M hidden layers $h_1, h_2, \ldots, h_m$ for deep learning for femtosecond laser processing, activating a respective hidden layer by performing nonlinear transformation on input parameters of a previous layer with a nonlinear activation function f(W, b), where W represents a weight value, and b represents an offset value, and performing deep learning in the M hidden layers to obtain output values $(y_1, y_2, \ldots, y_j)$ of an output layer Y of the deep learning model for femtosecond laser processing;
   5) evaluating inconsistency between the output values $(y_1, y_2, \ldots, y_j)$ of the output layer Y of the deep learning model for femtosecond laser processing and a target value O using a loss function L to obtain a loss function value θ represented by a formula:

θ=L(Y,O)

so as to complete a training process for deep learning;
   6) adjusting corresponding processing parameters of the chip according to the output values $(y_1, y_2, \ldots, y_j)$ of the output layer Y, optimizing the weight value W and the offset value b of the deep learning model, and repeating step 2) to step 5) for repeated training for femtosecond laser processing to minimize the loss function value θ; and
   7) outputting the optimized nano-ridge structure.

2. The method of claim 1, wherein the femtosecond laser has a pulse width equal to or less than 200 fs, a repetition frequency of 1 KHz to 1 GHz, and a laser energy of 0 to 100 mW.

3. The method of claim 1, wherein the predetermined polarization state is a predetermined angle between a laser polarization direction and a scanning direction, and the predetermined angle is kept unchanged by the deep learning for femtosecond laser processing during the scanning.

4. The method of claim 3, wherein the chip is scanned by:
   keeping the position of the chip unchanged, controlling laser to scan the chip along the main scanning trajectory with a scanning direction varied with the scanning trajectory, and keeping an angle between the laser polarization direction and the scanning direction unchanged;
   keeping the focus position of laser unchanged, controlling the chip to move along the main scanning trajectory, and adjusting the position and direction of the chip so as to keep an instant movement direction of the chip with respect to laser constant; or
   keeping the scanning direction of laser unchanged, adjusting the position and direction of the chip, and forming the main scanning trajectory while keeping the scanning direction unchanged.

5. The method of claim 1, wherein the scanning speed ranges from 100 to 1000 μm/s.

6. The method of claim 1, wherein the periodic nano-stripes of the nano-ridge structure are equally spaced, and a spacing between two adjacent nano-stripes ranges from 10 nm to 1 μm.

7. The method of claim 6, wherein the spacing between two adjacent nano-stripes ranges from 10 to 200 nm.

8. The method of claim 1, wherein an angle between a main scanning trajectory and each of the periodic nano-stripes ranges from 0 to 90°.

9. The method of claim 8, wherein the angle between the main scanning trajectory and each of the periodic nano-stripes is 90°.

10. The method of claim 1, wherein the super-resolution microscopy is super-lens imaging based on surface plasmon resonance, stimulated emission depletion microscopy (STED), photoactivated localization microscopy (PALM), structured illumination microscopy (SIM), or stochastic optical reconstruction microscopy (STORM).

11. The method of claim 1, wherein the super-resolution microscopic image of the nano-ridge structure is obtained by the deep learning for image super-resolution based on a deep learning model for image super-resolution, and the processing parameters of the nano-ridge structure are adjusted and optimized by the deep learning for femtosecond laser processing based on a deep learning model for femtosecond laser processing, which is initialized and optimized during the femtosecond laser processing.

12. The method of claim 1, wherein the periodic nano-stripe of the nano-ridge structure in the reconstructed image is visible in a predetermined image size; and
recognizing and processing the reconstructed image comprises:
recognizing the reconstructed image,
performing data enhancement, and
performing data preprocessing to obtain one-dimensional vectors as the input parameters $(x_1, x_2, \ldots, x_i)$, wherein the input parameters correspond to the characteristic parameters of the nano-ridge structure comprising a length, a spacing, and a parallelism degree of the periodic nano-stripes.

13. The method of claim 1, wherein activating the respective hidden layer by performing nonlinear transformation on input parameters of the previous layer with the nonlinear activation function f(W, b) comprises:
activating the hidden layers $h_1, h_2, \ldots, h_m$ with the corresponding nonlinear activation functions:

$$h_1 = f(W_1 X + b_1)$$
$$h_2 = f(W_2 h_1 + b_2)$$
$$\ldots$$
$$h_m = f(W_m h_{m-1} + b_m)$$

where $W_1, W_2, \ldots, W_m$ represent weight values of the respective hidden layers, and $b_1, b_2, \ldots, b_m$ represent offset values of the respective hidden layers,
performing deep learning in the M hidden layers comprises:
performing deep learning in the hidden layers $h_1, h_2, \ldots, h_m$ to obtain one-dimensional vectors as the output values $(y_1, y_2, \ldots, y_j)$ of the output layer Y:

$$Y = f(W_{m+1} h_m + b_{m+1})$$

where the one-dimensional vectors $(y_1, y_2, \ldots, y_j)$ correspond to processing parameters comprising a laser energy, a repetition frequency, a polarization state, and a scanning speed, and $W_{m+1}$ and $b_{m+1}$ represent a weight value and an offset value of the output layer, respectively.

14. The method of claim 1, wherein the super-resolution microscopic image is taken at a frequency greater than or equal to 50 fps.

15. An apparatus for processing a chip based on deep learning, comprising:
a processing platform, on which a chip to be processed is placed and fixed;
a laser device configured to emit femtosecond laser with adjustable pulse width, laser energy, repetition frequency and polarization state;
a scanning device movable in a direction in an XY plane, and configured to position a laser spot and scan the chip with the laser spot;
a focusing device configured to focus the femtosecond laser;
an imaging device configured to obtain a super-resolution microscopic image of a nano-ridge structure on a surface of the chip, and obtain a target image by removing an invalid area around the microscopic image, retaining a periodic nano-stripe area in a center of the microscopic image, and scaling the microscopic image to a preset size;
an adjusting device configured to adjust a translation of the processing platform in an X, Y or Z direction, or a rotation of the processing platform about a Z axis;
a positioning device configured to position the chip; and
a controller configured to control the laser device, the scanning device, the imaging device, the adjusting device, and the positioning device, and comprising a deep learning unit embedded therein,
wherein the deep learning unit is configured to:
reconstruct the target image obtained by the imaging device based on deep learning for image super-resolution to obtain the reconstructed image, and recognize and process the reconstructed image to obtain characteristic parameters of the nano-ridge structure as input parameters $(x_1, x_2, \ldots, x_i)$ of an input layer X of a deep learning model for femtosecond laser processing;
direct the input parameters of the input layer X into a neutral network including M hidden layers $h_1, h_2, \ldots, h_m$ for deep learning for femtosecond laser processing, activate a respective hidden layer by performing nonlinear transformation on input parameters of a previous layer with a nonlinear activation function f(W, b), where W represents a weight value, and b represents an offset value, and perform deep learning in the M hidden layers to obtain output values $(y_1, y_2, \ldots, y_j)$ of an output layer Y of the deep learning model for femtosecond laser processing; and
evaluate inconsistency between the output values $(y_1, y_2, \ldots, y_j)$ of the output layer Y of the deep learning model for femtosecond laser processing and a target value O using a loss function L to obtain a loss function value θ represented by a formula:

$$\theta = L(Y, O)$$

so as to complete a training process for deep learning; and
adjust corresponding processing parameters of the chip according to the output values $(y_1, y_2, \ldots y_j)$ of the output layer Y, optimize the weight value W and the offset value b of the deep learning model, and perform repeated training to minimize the loss function value θ.

16. The apparatus of claim 15, wherein the imaging device is a super-resolution microscope, and the super-resolution microscopic image is taken at a frequency greater than or equal to 50 fps.

17. The apparatus of claim 15, wherein the chip is scanned by:
adjusting a scanning speed and a scanning direction by the scanning device;
adjusting the scanning speed and the scanning direction by the adjusting device;
adjusting the scanning speed by the scanning device, and adjusting the scanning direction by the adjusting device; or
a combination thereof.

18. The apparatus of claim 15, wherein the femtosecond laser has a pulse width equal to or less than 200 fs, a repetition frequency of 1 KHz to 1 GHz, and a laser energy of 0 to 100 mW.

19. The apparatus of claim 15, wherein the scanning speed ranges from 100 to 1000 μm/s.

20. The apparatus of claim 15, wherein the periodic nano-stripes of the nano-ridge structure are equally spaced, and a spacing between two adjacent nano-stripes ranges from 10 to 200 nm.

* * * * *